(12) United States Patent
Sorbo

(10) Patent No.: US 10,394,313 B2
(45) Date of Patent: Aug. 27, 2019

(54) LOW LATENCY CROSS ADAPTER VR PRESENTATION

(71) Applicant: Microsoft Technology Licensing, LLC, Redmond, WA (US)

(72) Inventor: Bennett H. Sorbo, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 23 days.

(21) Appl. No.: 15/635,501

(22) Filed: Jun. 28, 2017

(65) Prior Publication Data

US 2018/0268511 A1  Sep. 20, 2018

Related U.S. Application Data

(60) Provisional application No. 62/471,732, filed on Mar. 15, 2017.

(51) Int. Cl.
*G06F 3/01* (2006.01)
*A63F 13/53* (2014.01)
(Continued)

(52) U.S. Cl.
CPC ............. *G06F 3/011* (2013.01); *A63F 13/53* (2014.09); *G06F 1/163* (2013.01); *G06F 3/012* (2013.01);
(Continued)

(58) Field of Classification Search
None
See application file for complete search history.

(56) References Cited

U.S. PATENT DOCUMENTS

| 6,473,086 B1 | 10/2002 | Morein et al. |
| 8,576,276 B2 | 11/2013 | Bar-Zeev et al. |

(Continued)

FOREIGN PATENT DOCUMENTS

| CN | 106296566 A | 1/2017 |
| WO | 2007140404 A2 | 12/2007 |
| WO | 2016190489 A1 | 12/2016 |

OTHER PUBLICATIONS

Stone, et al., "Immersive Molecular Visualization with Omnidirectional Stereoscopic Ray Tracing and Remote Rendering", In Proceedings of IEEE International Parallel and Distributed Processing Symposium Workshops, May 23, 2016, pp. 1048-1057.

(Continued)

*Primary Examiner* — Jwalant Amin
(74) *Attorney, Agent, or Firm* — Arent Fox LLP

(57) ABSTRACT

Examples described herein generally relate to rendering virtual reality images on a computer device including an integrated first graphics processing unit (GPU) and a discrete second GPU. The second GPU can receive first pose information of a head mounted display (HMD) connected to a video port associated with the first GPU. The second GPU can render a virtual reality source image from an application based on the first pose information. The computer device can transfer the virtual reality source image from the second GPU to the first GPU. The first GPU can receive second updated pose information of the HMD. The first GPU can adjust the virtual reality source image based on the second updated pose information. The computer device can display the adjusted virtual reality image on the HMD via the video port. The virtual reality source image may be divided into portions for pipelining among the GPUs.

17 Claims, 9 Drawing Sheets

(51) Int. Cl.
  *G06F 1/16*    (2006.01)
  *G06T 1/20*    (2006.01)
  *G06T 11/60*   (2006.01)
  *G06F 3/147*   (2006.01)
  *G09G 5/36*    (2006.01)
  *H04N 5/04*    (2006.01)

(52) U.S. Cl.
  CPC ........... *G06F 3/147* (2013.01); *G06T 1/20* (2013.01); *G06T 11/60* (2013.01); *G09G 5/363* (2013.01); *A63F 2300/66* (2013.01); *G09G 2360/06* (2013.01); *H04N 5/04* (2013.01)

(56) References Cited

U.S. PATENT DOCUMENTS

| | | | |
|---|---|---|---|
| 8,736,618 B2 | 5/2014 | Redman et al. | |
| 8,941,669 B1 | 1/2015 | Moreton | |
| 9,275,430 B2 | 3/2016 | Bakalash | |
| 9,400,695 B2 | 7/2016 | Sylvan et al. | |
| 9,524,138 B2 | 12/2016 | Boucher et al. | |
| 9,588,593 B2 | 3/2017 | Li | |
| 2014/0267403 A1* | 9/2014 | Maciocci | G06T 19/006 345/633 |
| 2014/0347456 A1* | 11/2014 | Kato | G02B 27/0093 348/59 |
| 2015/0002542 A1 | 1/2015 | Chan et al. | |
| 2015/0262322 A1 | 9/2015 | Cardozo | |
| 2015/0310665 A1 | 10/2015 | Michail et al. | |
| 2016/0035139 A1 | 2/2016 | Fuchs et al. | |
| 2016/0180495 A1 | 6/2016 | Thulasimani et al. | |
| 2016/0238852 A1 | 8/2016 | Ellsworth et al. | |
| 2016/0358299 A1 | 12/2016 | Toth | |
| 2016/0361658 A1 | 12/2016 | Osman et al. | |

OTHER PUBLICATIONS

Kaleem, et al., "Adaptive Heterogeneous Scheduling for Integrated GPUs", In Proceedings of the 23rd international conference on Parallel architectures and compilation, Aug. 24, 2014, pp. 151-162.
"International Search Report Issued in PCT Patent Application No. PCT/US18/021427", dated Jun. 18, 2018, 12 Pages.

* cited by examiner

LOW LATENCY CROSS ADAPTER VR PRESENTATION

CLAIM OF PRIORITY UNDER 35 U.S.C. § 119

This application claims priority to U.S. Provisional Application No. 62/471,732, titled "LOW LATENCY CROSS ADAPTER VR PRESENTATION," filed Mar. 15, 2017, which is assigned to the assignee hereof, and incorporated herein by reference in its entirety.

BACKGROUND

The present disclosure relates to a computer graphics system, and more particularly, to displaying virtual reality images using an integrated graphics processing unit and a dedicated graphics processing unit.

Use of computing devices is becoming more ubiquitous by the day. Computing devices range from standard desktop computers to wearable computing technology and beyond. One area of computing devices that has grown in recent years are gaming devices and virtual reality (VR) devices, which rely on a graphics processing unit (GPU) to render graphics from a computing device to a display device based on rendering instructions received from the computing device. In gaming devices, a scene produced on a display device can be oriented or modified based on user input (e.g., movement of a gamepad button or stick to cause movement of the orientation of the scene, introduction of items into the scene, etc.). Similarly, in VR devices, the scene produced on a display device can be oriented or modified based on user input, where the input may include detecting movement of the user's head (e.g., detected movement of the VR device).

Some personal computers (PCs), especially laptops and tablet type devices, include an integrated GPU that is integrated with a central processing unit (CPU) and a discrete GPU that is typically located on a separate card. Typically, a monitor port is connected to the integrated GPU. For applications with low demand for rendering, this hardware architecture reduces the need to power the discrete GPU, which may provide substantial power savings. For VR applications, however, the integrated GPU is typically unable to handle image rendering at the necessary speed, so image rendering is typically performed at the discrete GPU. A VR rendering may include a late-stage reprojection step, in which source images (including a left eye image and a right eye image) that were rendered based on initial position information, e.g., a pose, are updated based on a most recent position information of the head mounted display (HMD) and/or gamepad input. The rendered images must then be copied to the integrated GPU for display on the VR HMD via the video port. The cross adapter between the discrete GPU and the integrated GPU may cause a significant latency, such as on the order of 8-10 milliseconds (ms). The image processing at the discrete GPU must be completed well before a video synchronization (V-SYNC) so that the correct image is available at the integrated GPU at the V-SYNC. VR HMDs typically operate at 90 Hz, so the 8-10 ms latency may be perceptible to a user. For example, the rendered images may not keep up with head motion.

Thus, there is a need in the art for improvements in graphics processing for virtual reality applications on computer devices.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device for displaying virtual reality images. The computer device may include a memory to store data and instructions and a central processing unit in communication with the memory. The computer device may include a first GPU and a video port associated with the first GPU. The computer device may include a second GPU communicatively connected to the first GPU via an adapter. The computer device may include an application and a display control component in communication with the memory, the central processing unit, the first GPU, and the second GPU. The computer device may receive, at the second GPU, first pose information of a HMD connected to the video port. The computer device may render, by the second GPU, a virtual reality source image from the application based on the first pose information. The computer device may transfer the virtual reality source image via the adapter from the second GPU to the first GPU. The computer device may receive, at the first GPU, second pose information of the HMD obtained after at least a first portion of the virtual reality source image has been transferred to the first GPU. The computer device may adjust, by the first GPU, the virtual reality source image based on the second pose information to compensate for movement of the HMD between a time of the first pose information and a time that the first portion of the virtual reality source image has been transferred to the first GPU. The first GPU may complete adjusting at least the first portion of the virtual reality source image before a video synchronization. The computer device may display the adjusted virtual reality image on the HMD via the video port starting at the video synchronization.

Another example implementation relates to a method of displaying virtual reality images. The method may include receiving, at a second GPU, first pose information of a HMD connected to a video port associated with a first GPU. The method may include rendering, by the second GPU, a virtual reality source image from an application based on the first pose information. The method may include transferring the virtual reality source image from the second GPU to the first GPU via an adapter. The method may include receiving, at the first GPU, second pose information of the HMD obtained after at least a first portion of the virtual reality source image has been transferred to the first GPU. The method may include adjusting, by the first GPU, the virtual reality source image based on the second pose information to compensate for movement of the HMD between a time of the first pose information and a time that the first portion of the virtual reality source image has been transferred to the first GPU. The adjusting of at least a first portion of the virtual reality source image may be completed before a video synchronization. The method may include displaying the adjusted virtual reality image on the HMD via the video port starting at the video synchronization.

Another example implementation relates to a non-transitory computer-readable medium. The non-transitory computer-readable medium may include code executable by one or more processors for rendering graphics using a first GPU and a second GPU in a computing device. The code may include code for receiving, at the second GPU, first pose information of a HMD connected to a video port associated with the first GPU. The code may include code for rendering, by the second GPU, a virtual reality source image from an application based on the first pose information. The code may include code for transferring the virtual reality source image from the second GPU to the first GPU. At least a first portion of the virtual reality source image may be transferred prior to a video synchronization. The code may include code for receiving, at the first GPU or the second GPU, second pose information of the HMD at a set time before a video synchronization. The set time may be configured to allow the first GPU or the second GPU to complete adjusting at least the first portion of the virtual reality source image before the video synchronization. The code may include code for adjusting, by the first GPU or the second GPU, the virtual reality source image based on the second pose information to compensate for movement of the HMD between a time of the first pose information and the set time. The adjusting of at least the first portion of the virtual reality source image may be completed before the video synchronization. The code may include code for displaying the adjusted virtual reality image on the HMD via the video port starting at the video synchronization. At least one of the transferring or the adjusting of a second portion of the virtual reality source image may continue after the video synchronization.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

The present disclosure provides systems and methods for presentation of virtual reality images on a head mounted display (HMD). As used herein, the term virtual reality image includes an image of a virtual environment (e.g., virtual reality, mixed reality) based on one or more virtual input sources, and an image of a partially virtual environment (e.g., augmented reality) based on at least one virtual input source and at least one real world input source.

In an implementation, for example, this disclosure provides systems and methods for splitting work of rendering an image for display on a virtual reality (VR) head mounted display (HMD) between a discrete graphics processing unit (discrete GPU) and a GPU that is integrated with the central processing unit (CPU) (e.g., the integrated GPU). A monitor port is provided by the CPU, and the discrete GPU is coupled to the CPU via a cross adapter (e.g., PCI bus). The discrete GPU performs image rendering, then transfers the rendered images to the integrated GPU. The integrated GPU performs late stage reprojection of the rendered images based on updated position information, e.g., an updated pose, from the HMD. By performing only the late-stage reprojection on the integrated GPU, the latency between initiating the rendering and receiving the rendered images from the discrete GPU can be avoided, as the integrated GPU can use the most recent updated position information to provide the reprojection close-in-time to a video synchronization. In some cases, copying of data from the discrete GPU to the integrated GPU may be pipelined, and, for example in some instance, the data may be copied in blocks that are sent before the entire frame is processed to enable just-in-time processing at the integrated GPU.

Figure 1:
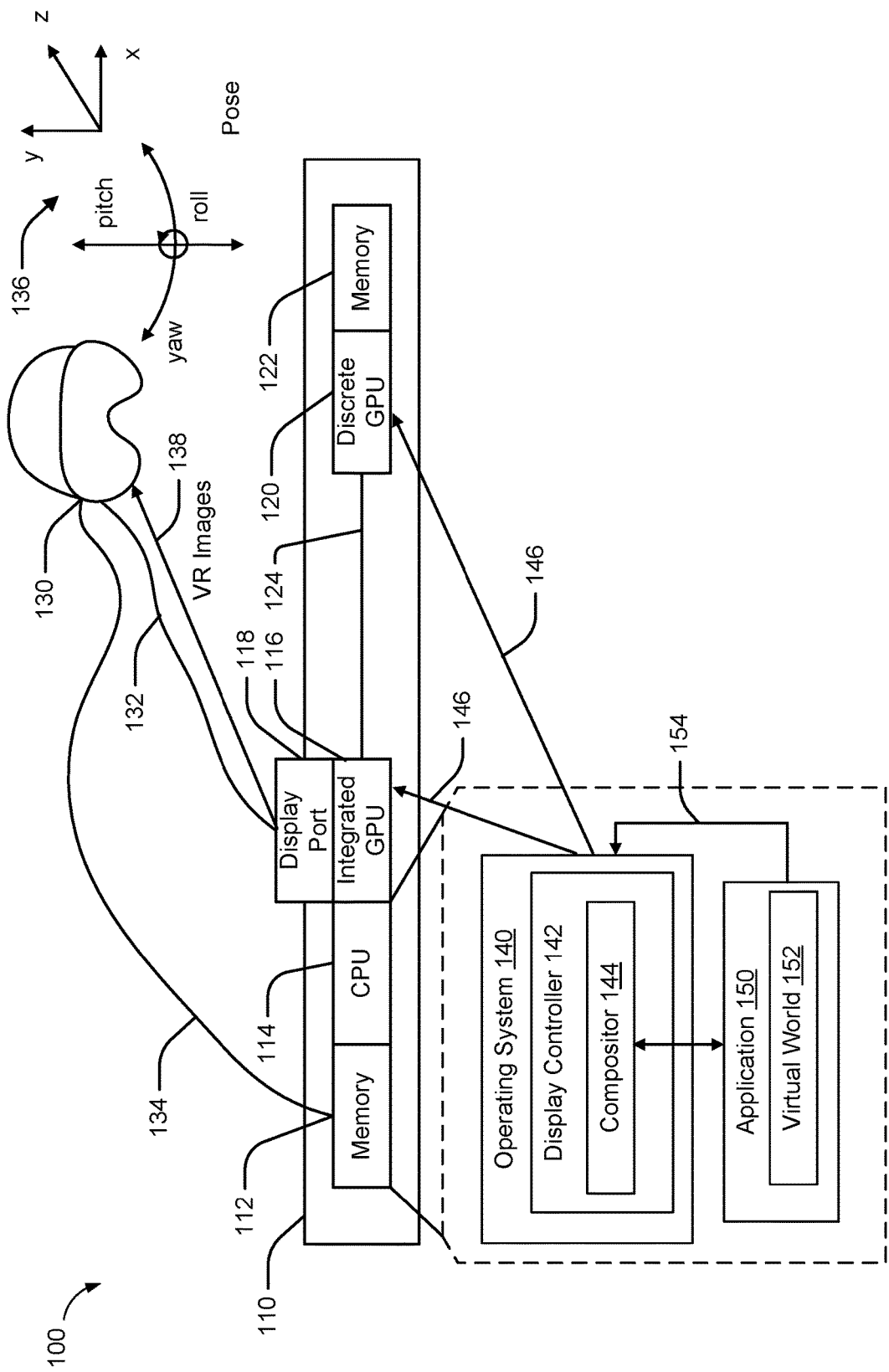
FIG. 1 is a schematic block diagram of an example system for displaying virtual reality images, in accordance with an implementation of the present disclosure.

Referring now to FIG. 1, an example computer system 100 may include a computer device 110 that provides video for display on a virtual reality head mounted display (HMD) 130 using both an integrated graphics processing unit (GPU) 116 and a discrete GPU 120. The HMD 130 may be connected to a video port 118 in communication with the CPU 114 and integrated GPU 116 on a motherboard of the computer device 110. Image processing may be divided between the discrete GPU 120 and the integrated GPU 116 in a manner that reduces the effects of delay due to latency in exchanging signals via an adapter 124 between the discrete GPU 120 and the integrated GPU 116. For example, the discrete GPU 120 may render virtual reality source images and transfer the source images to the integrated GPU 116. The integrated GPU 116 may perform a late stage adjustment based on updated input (e.g., updated position information) from the HMD 130 and provide the adjusted images directly to the video port 118. For example, the image processing pipeline may be adapted to perform the late stage adjustments based on the most recent available input from the HMD 130 before the video port 118 synchronizes with the HMD 130. The adjustment may compensate for movement of the HMD 130 from the time of the first pose information to time of the most recent available input from the HMD.

Computer device 110 may include any mobile or fixed computer device, which may be connectable to a network. Computer device 110 may be, for example, a computer device such as a desktop or laptop or tablet computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Computer device 110 may include a memory 112 and CPU 114 configured to control the operation of computer device 110. Memory 112 may be configured for storing data and/or computer-executable instructions defining and/or associated with an operating system 140 and/or application 150, and CPU 114 may execute operating system 140 and/or application 150. An example of memory 112 can include, but is not limited to, a type of memory usable by a computer, such as random access memory (RAM), read only memory (ROM), tapes, magnetic discs, optical discs, volatile memory, non-volatile memory, and any combination thereof. Memory 112 may store local versions of applications being executed by CPU 114.

The CPU 114 may include one or more processors for executing instructions. An example of CPU 114 can include, but is not limited to, any processor specially programmed as described herein, including a controller, microcontroller, application specific integrated circuit (ASIC), field programmable gate array (FPGA), system on chip (SoC), or other programmable logic or state machine. The CPU 114 may include other processing components such as an arithmetic logic unit (ALU), registers, and a control unit.

The CPU 114 may also include the integrated GPU 116, which, in some cases, may be integrated onto the motherboard with the CPU 114 and memory 112. The integrated GPU 116 may be on the same die with the CPU 114. The integrated GPU 116 may include dedicated memory (not shown).

Computer device 110 may also include the video port 118 integrated with the CPU 114 and/or integrated GPU 116. For example, the video port 118 may be located on the motherboard. The video port 118 may be, for example, a VGA, DVI, HDMI, or DisplayPort output. The video port 118 may provide a video signal that may be utilized by a video display device such as a monitor (not shown) or a virtual reality head mounted display (HMD) 130. The CPU 114, integrated GPU 116, and video port 118 may perform general graphics processing operations for the computer device 110.

Computer device 110 may also include the discrete GPU 120, which may be located on a separate card and connected to the motherboard via adapter 124. For example, the adapter 124 may be a peripheral connect interface (PCI), accelerated graphics port (AGP), PCI-Express (PCI-E), or similar connection. The discrete GPU 120 may also be an external GPU connected to the computer device 110 via the adapter 124. The discrete GPU 120 generally has greater graphics processing capability (e.g., can process more instructions faster) than the integrated GPU 116. The discrete GPU 120 may include a dedicated memory 122. The discrete GPU 120 may be utilized for graphics intensive applications such as 3D gaming. By being discrete from the CPU 114 and the integrated GPU 116, the discrete GPU 120 may be powered down when not in use. In an implementation, the discrete GPU 120 may not include a video port 118. The computer device 110 may provide display of rendered images via the video port 118 using the integrated GPU 116. This may save significant power in battery powered computer devices such as laptops and tablets. In an implementation where an external GPU is used, the computer device 110 may also include an internal discrete GPU. Such an internal discrete GPU may include a video port 118 and function as an integrated GPU with the external GPU functioning as a discrete GPU, as described herein.

The operating system 140 may include instructions (such as application 150) stored in memory 112 and executed by the CPU 114. The operating system 140 may include a display controller 142 for controlling the integrated GPU 116 and the discrete GPU 120. For example, the display controller 142 may provide commands 146 to the integrated GPU 116 and discrete GPU 120 to perform one or more specific graphics processing operations such as rendering source images or performing adjustments. The display controller 142 may include a compositor 144, in the form of a hardware and/or software component, configured to combine multiple sources of information to create a complete image for display. For example, in a 2D environment, the compositor 144 may determine in which windows various applications are to be rendered. Similarly, in a 3D environment, the compositor 144 may determine locations of a virtual world 152 in which to render various images from various sources. For example, the virtual world 152 may be a virtual reality, mixed reality, or augmented reality environment capable of being at least partially displayed to a user via HMD 130.

The computer device 110 may also include an application 150 including instructions stored in memory 112 and executed by the CPU 114. The application 150, for example, may be a virtual reality application that generates the virtual world 152. For example, the application 150 may be a virtual reality game or collaborative work environment. The application 150 may provide information regarding the virtual world 152 to the compositor 144 for generating images representing at least some portion of the virtual world 152.

The HMD 130 may provide both input and output capabilities for generating and displaying virtual reality images. In order to position a user in a virtual reality environment such as virtual world 152, the HMD 130 may provide position information 136 to the application 150 as well as the integrated GPU 116 and discrete GPU 120. For example, the position information 136 may be a pose with six degrees of freedom (X, Y, Z, pitch, yaw, and roll). The HMD 130 may provide the position information 136 to the computer device 110 via a connection such as universal serial bus (USB) 134. The display controller 142 may control the integrated GPU 116 and the discrete GPU 120 to generate a series of video frames, each frame based on application information 154 (e.g., the virtual world 152) from the application 150 and initial and updated position information 136 (e.g., pose) from the HMD 130. The video frames 138 are provided by the video port 118 via a cable 132 to the HMD 130. Accordingly, the HMD 130 displays video frames 138 as VR images that track the motion of the user's head such that the user perceives movement around the virtual world 152. The HMD 130 may utilize a relatively high refresh rate (e.g., 90 Hz) compared to traditional stationary monitors. The higher refresh rate allows for smoother movement.

In an implementation, the integrated GPU 116 may lack processing capability for performing one or more graphics processing operations for virtual reality. For example, rendering 3D images based on the virtual world 152 may be a processing and memory intense operation. The integrated GPU 116 may be unable to render images of sufficient quality (e.g., resolution) at the refresh rate of the HMD 130. For example, the processing power of the integrated GPU 116 may perform a number of floating point operations per second that is less than a threshold for rendering an image at a desired resolution. In another example, the integrated GPU 116 may be limited by memory size or speed. Accordingly, image rendering may be performed by the discrete GPU 120. The discrete GPU 120 may generally have greater processing capabilities such as a number of floating point operations per second or faster or larger dedicated memory. In an implementation where the computer system 100 includes an external GPU and an internal GPU having a video port, the external GPU may generally have greater processing capabilities than the internal GPU.

When rendering virtual reality images, there may be a processing time between when initial inputs (e.g., position information 136, or pose, and virtual world 152) are received and when rendered images are available. During the processing time, the user's head may have moved such that the rendered images no longer represent the current position of the user's head. In order to reduce the difference between the position of a user with respect to a displayed image and the actual position of the user, the rendered images may be updated prior to display. For example, a late stage reprojection may be used to adjust the rendered source images to updated images for display. The late stage reprojection may include, for example, skewing or otherwise adjusting the rendered images according to a change in the position information 136, or pose. That is, the late state reprojection may compensate for the change in the position information by skewing the rendered source image to make it appear as if it is being viewed from the most recent position information. The late stage reprojection processing may consume significantly less processing time than rendering of the images. Accordingly, the updated images may be based on a pose that is closer in time to the time the images are displayed.

The adapter 124 may also induce a delay in image processing. For example, the adapter 124 may impart a delay on the order of 8-10 ms to copy an image from the discrete GPU 120 to the integrated GPU 116. If the late stage reprojection is performed by the discrete GPU 120, the delay due to the discrete GPU 120 may increase the delay between the most recent pose input and displaying the images on the HMD 130.

In an implementation, the display controller 142 may divide the image processing between the discrete GPU 120 and the integrated GPU 116 such that the discrete GPU 120 renders source images that are transferred to the integrated GPU for late stage reprojection based on updated position information 136, or an updated pose, before display. This arrangement may reduce the time between the final pose input and display at the HMD 130. As explained in further detail below, the pipelining of the image processing may be adapted to minimize a time between the final pose and display of the rendering image at the HMD 130.

Figure 2:
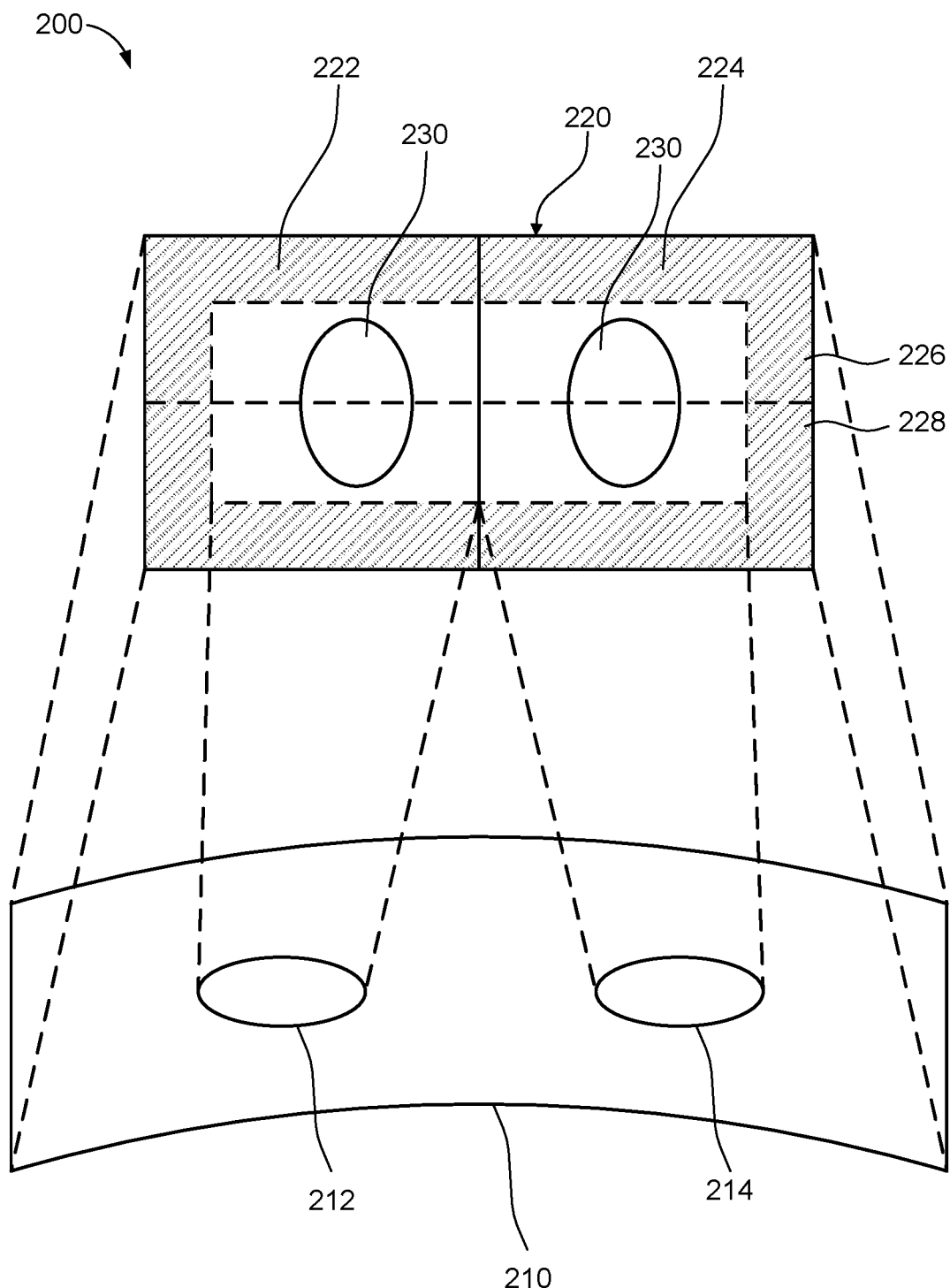
FIG. 2 is a conceptual diagram illustrating a head mounted display for displaying virtual reality images, in accordance with an implementation of the present disclosure.

Referring now to FIG. 2, a conceptual diagram 200 illustrates operation of the HMD 130. The HMD 130 may include optics 210 for focusing a user's vision on one or more portions of one or more display panels 220. The display panels 220 may display one or more images (e.g., left eye image 222 and right eye image 224) based on signals received from a display controller (e.g., integrated GPU 116). For example, the display panels 220 may include a liquid crystal display (LCD) (which may include a light emitting diode (LED) backlit LCD display), organic LED (OLED) display, digital light processing (DLP) display, etc. In an implementation, the integrated GPU 116 may provide the HMD 130 with multiplexed left eye image 222 and right eye image 224 in a side-by-side arrangement. It should be appreciated that the left eye image 222 and right eye image 224 may also be multiplexed vertically or in time. The integrated GPU 116 may scan an image out to the display panels 220 via the video port 118. As used herein, scanning may refer to a process of updating pixels on the display panels 220.

The optics 210 may include left eye optics 212 for focusing the user's left eye on the left eye image 222 and right eye optics 214 for focusing the user's right eye on the right eye image 224. For example, the optics 210 may focus the user's eyes on a central portion of each of the left eye image 222 and the right eye image 224. A border portion of the left eye image 222 and right eye image 224 may be displayed by the display panel 220, but may not be visible to the user due to the optics 210. The user's brain may combine the images viewed by each eye to create the perception that the user is viewing a 3D environment. For example, both the left eye image 222 and the right eye image 224 may include an object 230 that may be perceived as a three dimensional object.

In an implementation, a virtual reality image may be divided into two or more portions. The left eye image 222 and the right eye image 224 may form a natural division of the virtual reality image. The virtual reality image may also be divided vertically, for example, into top portion 226 and bottom portion 228. In implementations where the integrated GPU 116 scans images line-by-line from the top to the HMD 130 (specifically the display panel 220), it may be advantageous for the integrated GPU 116 to first perform an adjusting operation on the top portion 226 to ensure that the adjustments are finished before scanning begins (e.g., at a V-SYNC). The integrated GPU 116 may finish an adjusting operation on the bottom portion 228 after the V-SYNC and before the scanning reaches the bottom portion 228. Although the source image is illustrated as being divided into two vertical portions, additional divisions may be used. Additionally, for example when the left eye and right eye images are multiplexed in time, the integrated GPU 116 may perform an adjusting operation on the left eye image 222 before the V-SYNC and complete the adjusting operation on the right eye image after the V-SYNC but before the right eye image is scanned. Additionally, the left eye image 222 and the right eye image 224 may be sub-divided into different horizontal portions, which may be used when the display panel 220 requests vertical columns moving side to side to be scanned.

Figure 3:
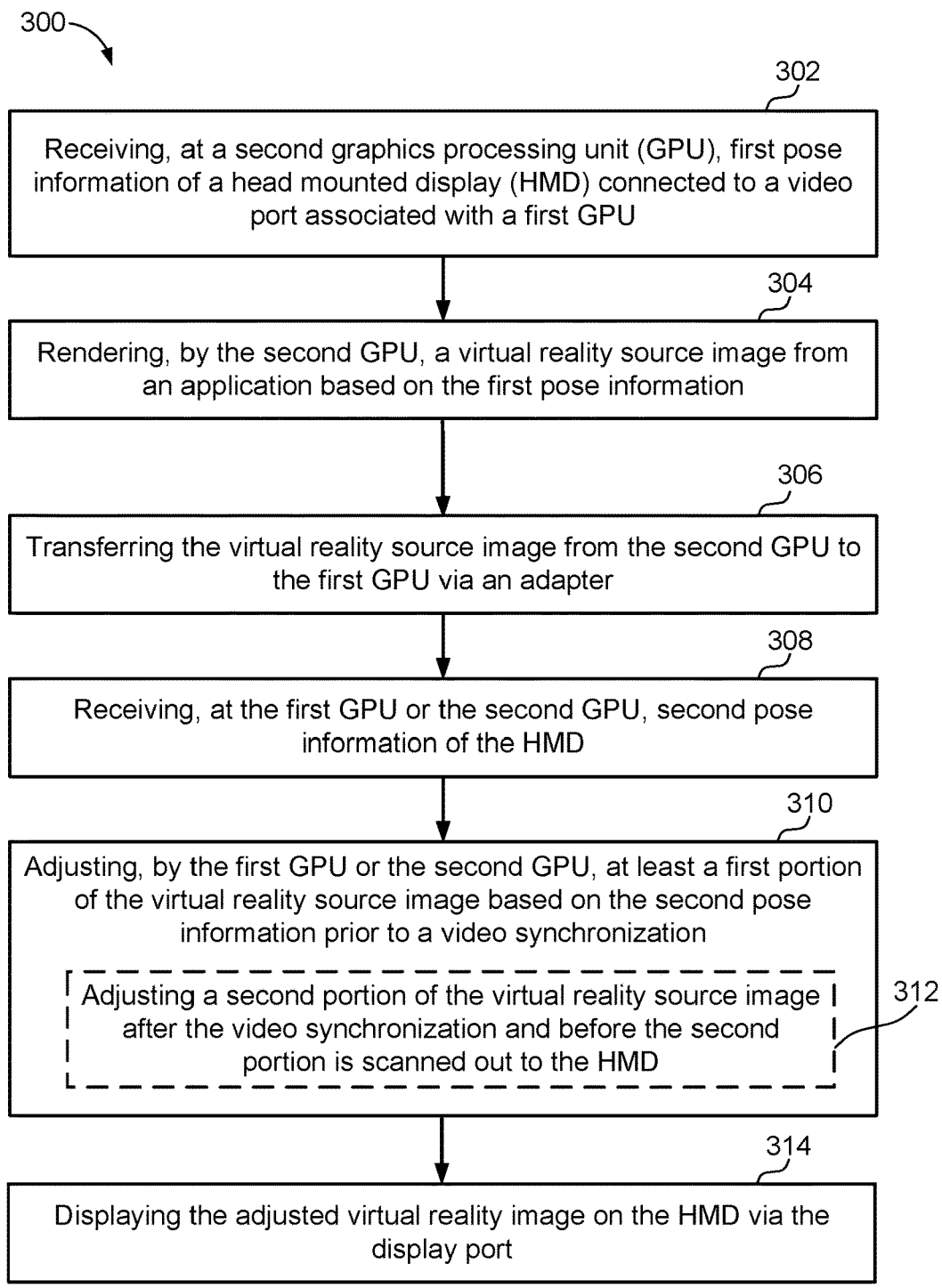
FIG. 3 is a flow chart of a method for displaying virtual reality images in accordance with an implementation of the present disclosure.

Referring now to FIG. 3, an example method 300 provides for the computer device 110 to display virtual reality images on the HMD 130. For example, method 300 may be used for displaying the virtual world 152 generated by the application 150 in an orientation relative to the user based on position information 136, or a pose, from the HMD 130, as executed on computer device 110. The actions illustrated in method 300 may overlap in time. For example, at an instant in time, two of the actions may be performed by different components. The execution of the actions may also be interleaved on a component. Additionally, the actions illustrated in method 300 may be performed in an order other than illustrated in FIG. 3. Further details and examples of timing are discussed below with respect to FIGS. 4-8.

At 302, method 300 may include receiving, at a second GPU, first pose information of a HMD connected to a video port associated with a first GPU. For example, the discrete GPU 120 may receive the first pose information from the HMD 130, which may be connected to the video port 118 that is integrated with the integrated GPU 116 and the CPU 114. For example, the first pose information may be received at a first time. The discrete GPU 120 may latch the received first pose information for use in graphics processing for a frame. That is, the first pose information may not change during processing by the discrete GPU 120.

At 304, method 300 may include rendering, by the second GPU, a virtual reality source image from an application based on the first pose information. For example, the discrete GPU 120 may render a source image from the application 150 based on the first pose information. The virtual reality source image may represent a view of the virtual world 152 from the first pose at the first time. For example, the discrete GPU 120 may receive information regarding the virtual world 152 (e.g., positions of objects) and render an image based on the location of the pose in the virtual world. The virtual reality source image may include the left eye image 222 and the right eye image 224 for stereoscopic viewing by a user on the HMD 130.

At 306, method 300 may include transferring the virtual reality source image from the second GPU to the first GPU. For example, the discrete GPU 120 may transfer the virtual reality source image to the integrated GPU 116. The discrete GPU 120 may transfer the virtual reality source image via the adapter 124, for example, by copying the virtual reality source image. The transferring operation may be adapted to provide portions of the virtual reality source image to the integrated GPU 116 as needed. For example, the discrete GPU 120 may transfer at least a first portion of the virtual reality source image prior to a video synchronization. The virtual reality source image may be divided both vertically (e.g., into left and right eye portions) and horizontally (e.g., into top and bottom portions). The portions of the source image may be transferred in the order in which the portions will be displayed. For example, the discrete GPU 120 may transfer the top portion 226 of left eye image 222 followed by the top portion 226 of the right eye image 224 followed by the bottom portion 228 of the left eye image 222 followed by the bottom portion 228 of the right eye image 224.

At 308, method 300 may include receiving, at the first GPU or the second GPU, second pose information of the HMD. For example, the integrated GPU 116 or the discrete GPU 120 may receive the second pose information from the HMD 130. The integrated GPU 116 or the discrete GPU 120 may latch the second pose information for use throughout an adjusting operation. That is, even if new pose information becomes available after latching, the integrated GPU 116 or the discrete GPU 120 may continue the adjusting operation based on the latched second pose information. As discussed in further detail below, the second pose information may be received as close in time to a video synchronization as possible while still allowing the integrated GPU 116 or the discrete GPU 120 to complete at least a portion of the adjusting operation before the adjusted virtual reality images are displayed. In an implementation where the action 308 is performed by the integrated GPU 116, the action 308 may be performed after the action 306. For example, the integrated GPU 116 may receive the second pose information after at least a first portion of the virtual reality source image has been transferred to the integrated GPU 116. In an implementation where the action 308 is performed by the discrete GPU 120, the action 308 may be performed before the action 306. For example, the discrete GPU 120 may receive the second pose information at a set time before a video synchronization. The set time may be configured to allow the discrete GPU 120 to complete adjusting at least the first portion of the virtual reality source image before the video synchronization. The set time may also be configured to allow the discrete GPU 120 to complete transferring at least the first portion of the virtual reality source image to the integrated GPU 116 before the video synchronization.

At 310, method 300 may include adjusting, by the first GPU or the second GPU, at least a first portion of the virtual reality source image based on the second pose information prior to a video synchronization. For example, the integrated GPU 116 or the discrete GPU 120 may adjust at least a first portion (e.g., top portion 226) of the virtual reality source image based on the second pose information prior to the video synchronization. The integrated GPU 116 or the discrete GPU 120 may, for example, perform a late stage reprojection of the virtual reality source image based on the second pose information. The late stage reprojection may skew or otherwise adjust the rendered images to compensate for the change between the first pose and the second pose. In an implementation where the action 310 is performed by the integrated GPU 116, the action 310 may be performed after the action 306. The adjusting may compensate for movement of the HMD 130 between a time of the first pose information and a time that the first portion of the virtual reality source image has been transferred to the integrated GPU 116. In an implementation where the action 310 is performed by the discrete GPU 120, the action 310 may be performed before the action 306. The adjusting may compensate for movement of the HMD between a time of the first pose information and the set time. In an implementation, the adjusting of a second portion of the virtual reality source image may be completed after the video synchronization and before the second portion is scanned out to the HMD. For example, at 312 the action 310 may optionally include adjusting a second portion of the virtual reality source image after the video synchronization and before the second portion is scanned out to the HMD. For example, the integrated GPU 116 or the discrete GPU 120 may adjust a second portion (e.g., (e.g., bottom portion 228) of the virtual reality source image after the video synchronization and before the second portion is scanned out to the HMD 130.

At 314, method 300 may include displaying the adjusted virtual reality image on the HMD via the video port. For example, the integrated GPU 116 may display the adjusted virtual reality images on the HMD 130 via the video port 118. The integrated GPU 116 may, for example, make the adjusted virtual reality images available in a buffer for scanning out to the HMD 130. The displaying may begin at a V-SYNC. In an implementation, the adjusting at 310 may not be completed at the V-SYNC, but each portion may be completed by the time the integrated GPU scans the respective portion out to the HMD 130. In an implementation, the action 314 may be started before either the action 306 or the action 310 has been completed. For example, the action 314 may begin at a video synchronization event when only a portion of the image has been adjusted or copied and the action 312 may be completed after the action 306 and 310 are completed.

Figure 4:
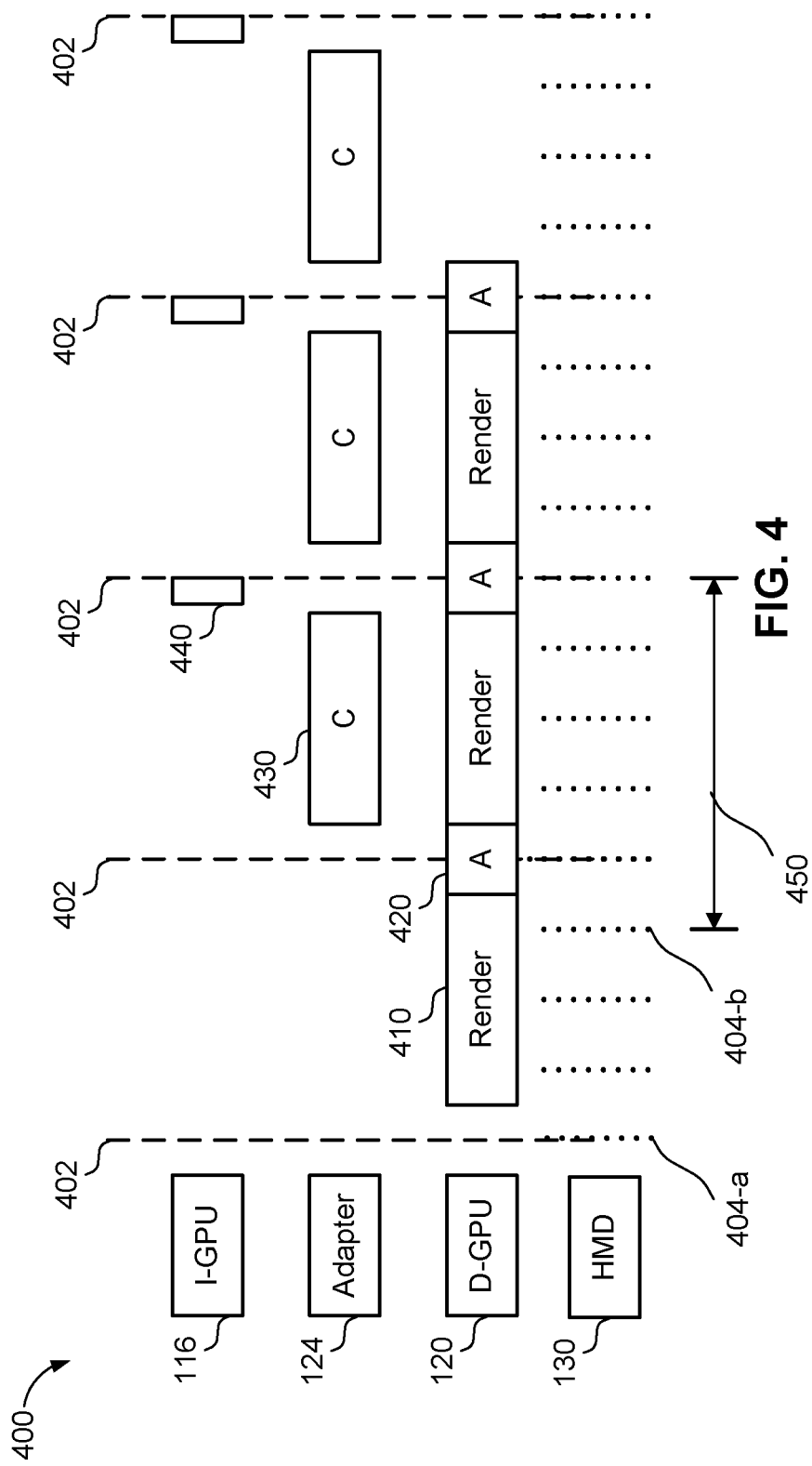
FIG. 4 is a timing diagram illustrating image processing in accordance with an implementation of the present disclosure.

Referring now to FIG. 4, an example timing diagram 400 illustrates rendering and display of virtual reality images using an integrated GPU 116 and a discrete GPU 120, where latency in presenting images may occur based on late stage adjustments by the discrete GPU 120 and copying of the adjusted image via an adapter 124 connected to the integrated GPU 116. The discrete GPU 120 may be coupled with the integrated GPU 116 via an adapter 124. The HMD 130 may have a periodic V-SYNC event 402, which may correspond to the refresh rate of the HMD 130. For example, a refresh rate for virtual reality may be 90 Hz, resulting in a V-SYNC event 402 every 11 milliseconds. The HMD 130 may also provide pose updates 404. The pose updates 404 may be more frequent than V-SYNC events 402. For example, as illustrated, the pose updates 404 may occur at a rate of 360 Hz. Other example rates may be 120 Hz or 240 Hz.

The discrete GPU 120 may perform a rendering operation 410 to render an image frame, such as for a VR image associated with application 150 (FIG. 1) and HMD 130 (FIG. 1). The rendering operation 410 may be a computationally intense operation. The time for completing the rendering operation 410 may depend on the quality of the rendered images being produced. For example, the rendering time may be based on factors such as resolution and number of colors, as well as quality of various visual effects (e.g., shadows or particles). The quality of the images may be adjusted based on hardware capability such that the discrete GPU 120 is typically capable of rendering new frames at the refresh rate. The rendering operation 410 may be based on a first pose of the HMD 130 at a time before the rendering operation 410 is started. For example, as illustrated, the discrete GPU 120 may latch pose information at the pose update 404-*a* corresponding to a V-SYNC event 402.

The discrete GPU 120 may also perform an adjusting operation 420. The adjusting operation 420 may be a less computationally intensive operation than the rendering operation and take the discrete GPU 120 a shorter time to perform. The adjusting operation 420 may be based on second pose information, which may be obtained from the HMD 130 at a later time. For example, the second pose information may be latched at pose update 404-*b* before the start of the adjusting operation 420. Once the adjusting operation 420 is completed, the adapter 124 may perform a copying operation 430 on the rendered and adjusted images to copy the images to the integrated GPU 116, where the video port 118 is located. The copying operation 430 may take approximately 8-10 ms or more depending on hardware. Once the integrated GPU 116 obtains the images, the integrated GPU 116 may perform a display operation 440 before the next V-SYNC event 402 to provide the images to the HMD 130. A time period 450 may represent the time between the last pose update 404-*b* and the V-SYNC event 402 at which the virtual reality images are displayed to the user. That is, the time period 450 may represent the time between the last input and the output based on that input. As illustrated in FIG. 4, the time period 450 is longer than one frame at the refresh rate due mostly to the copying operation 430.

Figure 5:
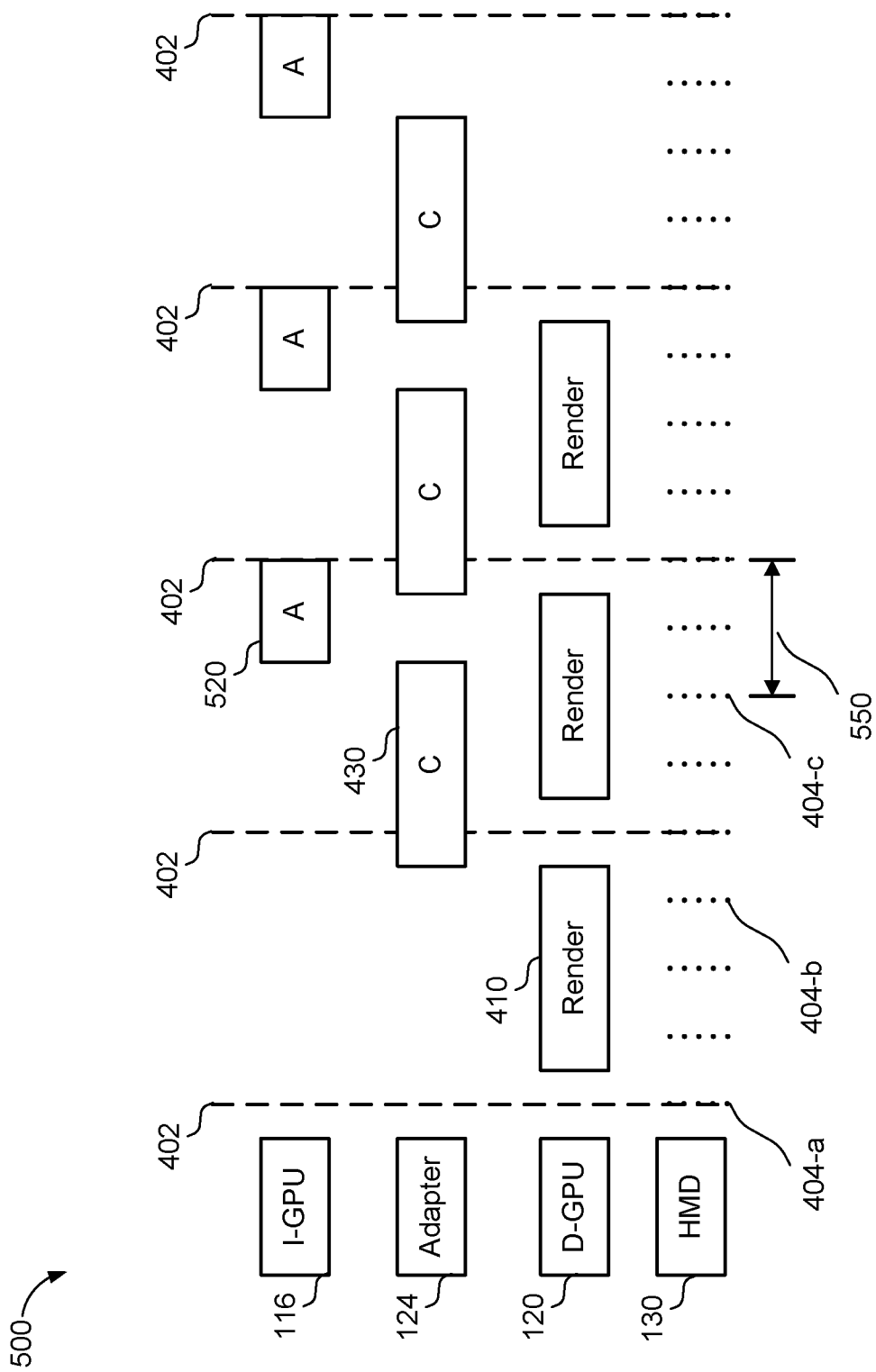
FIG. 5 is a timing diagram illustrating image processing in accordance with an implementation of the present disclosure.

Referring now to FIG. 5, timing diagram 500 illustrates another example of rendering and display of virtual reality images using the integrated GPU 116 and the discrete GPU 120, where latency in presenting images may be reduced by performing late stage adjustments by the integrated GPU 116. The rate of V-SYNC events 402 and pose updates 404 may be the same as in FIG. 4. The discrete GPU 120 may perform the rendering operation 410. For the sake of illustration, the rendering operation 410 is shown as taking the same time as in FIG. 4. It should be noted that timing diagram 500 illustrates idle periods (e.g., the blank spaces between rendering operations 410) for the discrete GPU 120, which may be used to increase the rendering quality. Rather than performing the adjusting operation 420, the discrete GPU 120 may initiate the copying operation 430 once the rendering operation 410 is complete. The adapter 124 may perform the copying operation 430 in the same time as in FIG. 4. The integrated GPU 116 may perform an adjusting operation 520. The adjusting operation 520 may use a different time than the adjusting operation 420 (FIG. 4) because the integrated GPU 116 may have different hardware capabilities. Generally, the integrated GPU 116 has lower capabilities, so the adjusting operation 520 is illustrated as taking more time than the adjusting operation 420. The adjusting operation 520 may also be a different operation than the adjusting operation 420. For example, the adjusting operation 520 may include display processing (e.g., copying adjusted images to the appropriate buffer). The adjusting operation 520 may be based on second pose information obtained at pose update 404-*c*. As illustrated, the pose update 404-*c* may be significantly later than the pose update 404-*b* because the integrated GPU 116 may obtain the second pose after some or all of the copying operation 430. Therefore, the time period 550 may be shorter than the time period 450, and thus the adjusted images forwarded by the integrated GPU 116 to the display may have reduced latency.

Figure 6:
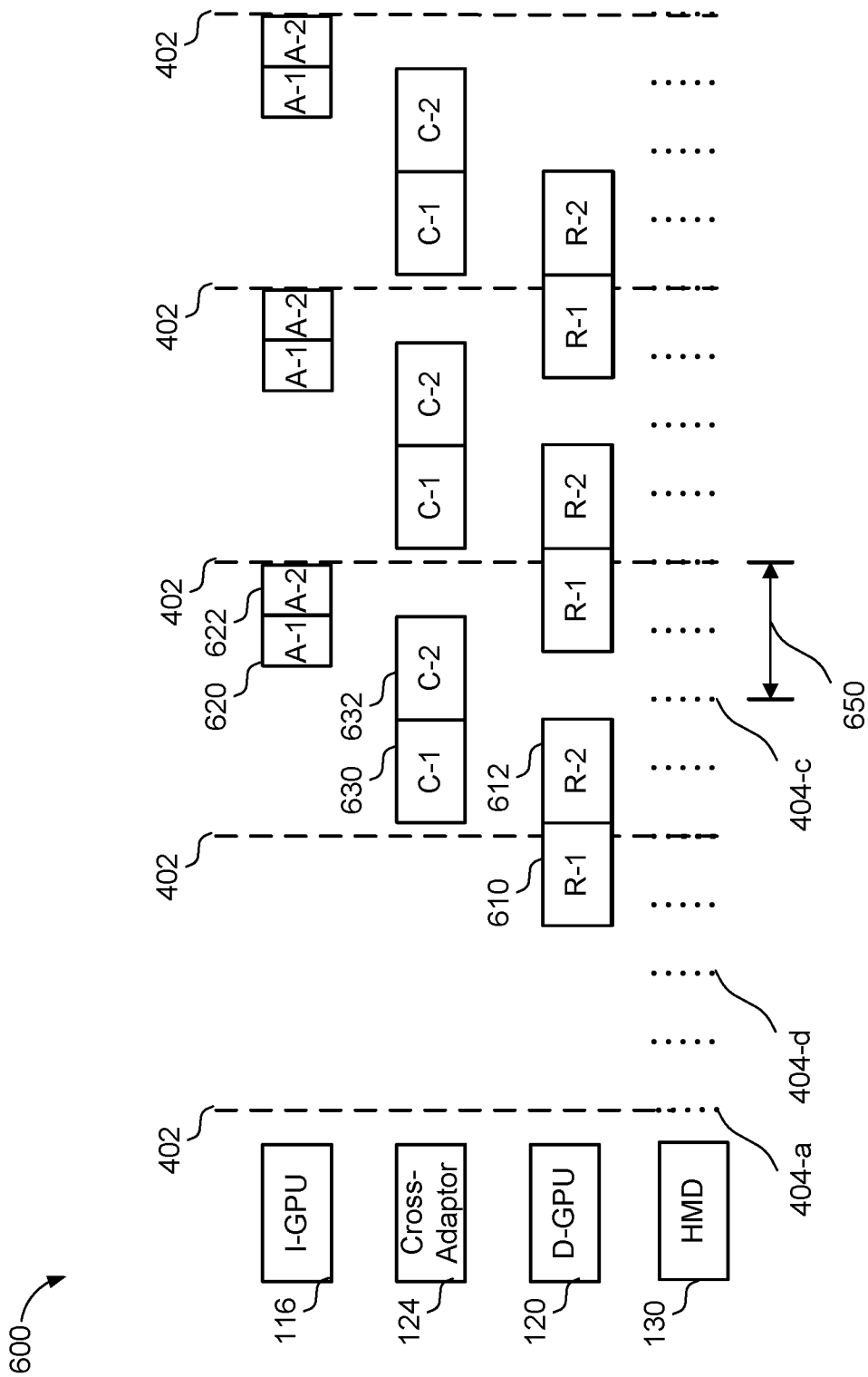
FIG. 6 is a timing diagram illustrating image processing in accordance with an implementation of the present disclosure.

Referring now to FIG. 6, timing diagram 600 illustrates another example of rendering and display of virtual reality images using the integrated GPU 116 and the discrete GPU 120, where further latency reductions in presenting images may be obtained based on dividing the rendering into different portions or chunks and performing late stage adjustments by the integrated GPU 116. The rate of V-SYNC events 402 and pose updates 404 may be the same as in FIG. 4. The discrete GPU 120 may perform rendering operations 610 and 612. The rendering operations 610 and 612 may render different portions of the virtual reality source image. For example, the rendering operation 610 may render a left eye portion and the rendering operation 612 may render a right eye portion. The portions may also be divided horizontally or vertically. Although two rendering operations are illustrated, it should be appreciated that an image may be rendered as a larger number of individual portions. For the sake of illustration, the rendering operations 610 and 612 are shown as taking a total time equal to the rendering operation 410. It should be noted that timing diagram 600 illustrates idle periods (e.g., blank spaces between different sets of rendering operations 610 and 612) for the discrete GPU 120, which may be used to increase the rendering quality. The discrete GPU 120 may initiate a copying operation 630 upon completing the rendering operation 610 and initiate a copying operation 632 upon completion of the rendering operation 612 and the copying operation 630. The total time for the copying operation 630 and 632 may be the same as for the copying operation 430. The adapter 124 may perform the copying operation 430 in the same time as in FIG. 4. The integrated GPU 116 may perform adjustment operations 620 and 622 on the respective portions of the virtual reality source image. The integrated GPU 116 may begin the adjustment operation 620 any time after the copying operation 630 and begin the adjustment operation 622 after the copying operation 632 is completed. By dividing the operations based on portions or chunks, the start time of the rendering operation 610 may be moved later, allowing for use of more recent pose information. For example, instead of latching the first pose at pose update 404-*a*, the discrete GPU 120 may latch the first pose at pose update 404-*d*. Because the adjustment operations 620 and 622 may use the same total time as the adjusting operation 520, the time period 650 may remain the same as the time period 550. However, because the virtual reality source image is based on a more recent pose (e.g., pose update 404-*d*), the amount of adjustment may be less, resulting in a higher quality final image and less latency experienced by the user.

Figure 7:
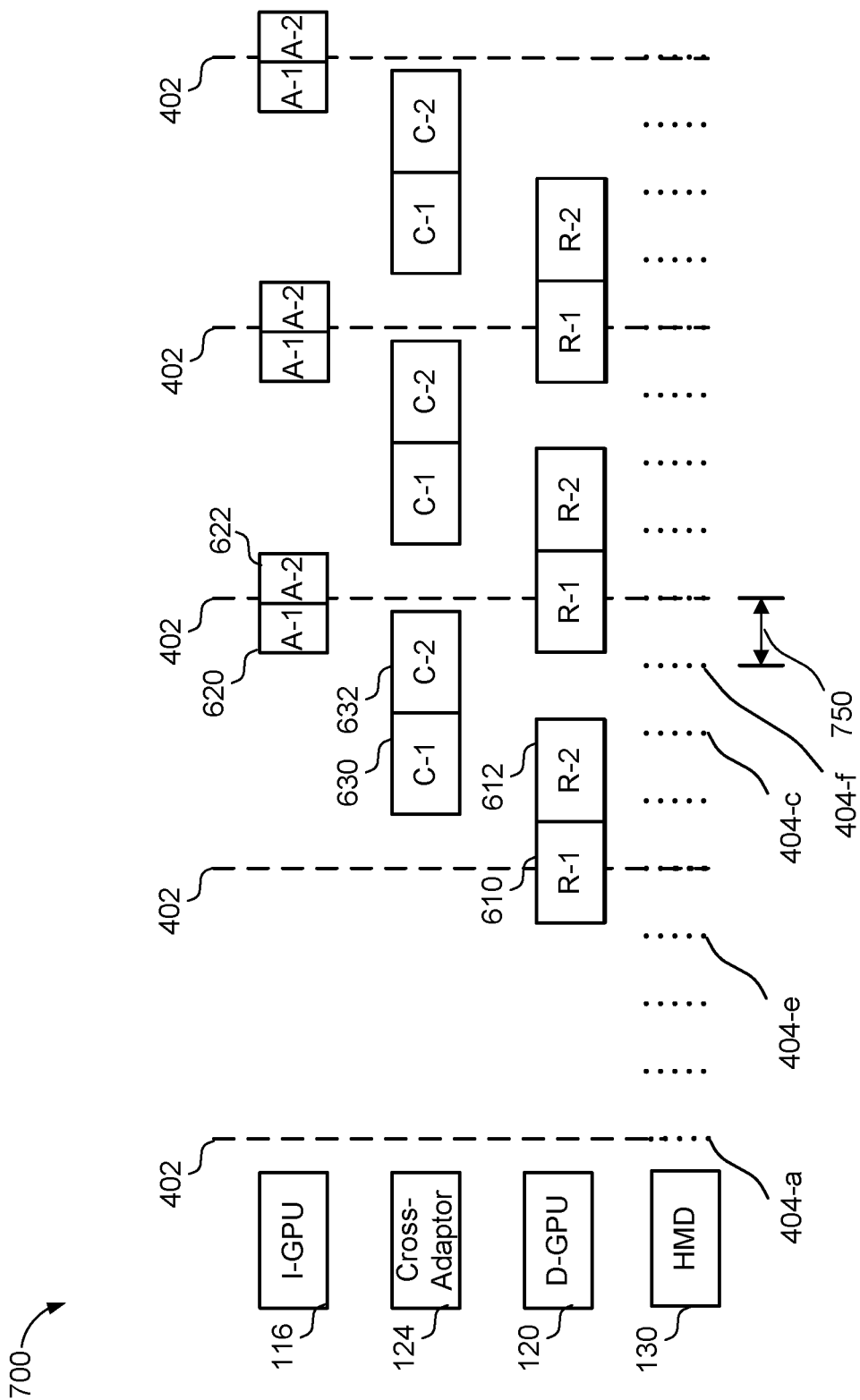
FIG. 7 is a timing diagram illustrating image processing in accordance with an implementation of the present disclosure.

Referring now to FIG. 7, timing diagram 700 illustrates another example of rendering and display of virtual reality images using the integrated GPU 116 and the discrete GPU 120, where additional latency reductions in presenting images may be obtained based on dividing the rendering into portions or chunks and performing some portion of the late stage adjustments by the integrated GPU 116 after the V-SYNC event 402. The rate of V-SYNC events 402 and pose updates 404 may be the same as in FIG. 4. The discrete GPU 120 may perform the rendering operations 610 and 612, the adapter 124 may perform the copying operations 630 and 632, and the integrated GPU 116 may perform the adjustment operations 620 and 622. The integrated GPU 116 may complete the adjustment operation 622 after the V-SYNC event 402. The integrated GPU 116 may scan the final virtual reality images out to the HMD 130 in a set order (e.g., line-by-line starting from the top). Accordingly, when the portion of the image corresponding to the adjustment operation 622 is located in the last portion of the frame to be scanned, the integrated GPU 116 may complete the adjustment operation in the time between the V-SYNC event 402 and the time the last portion of the frame is scanned. In an implementation, completing a portion of the adjustment operation 622 after the V-SYNC event 402 may allow the adjustment operation 620 to begin after another pose update. For example, the adjustment operations 620 and 622 may be based on the pose update 404-f instead of the pose update 404-c, leading to a reduced time period 750. Additionally, the rendering operations 610 and 612 may be moved later allowing use of pose update 404-e, thereby reducing latency experienced by the user.

Figure 8:
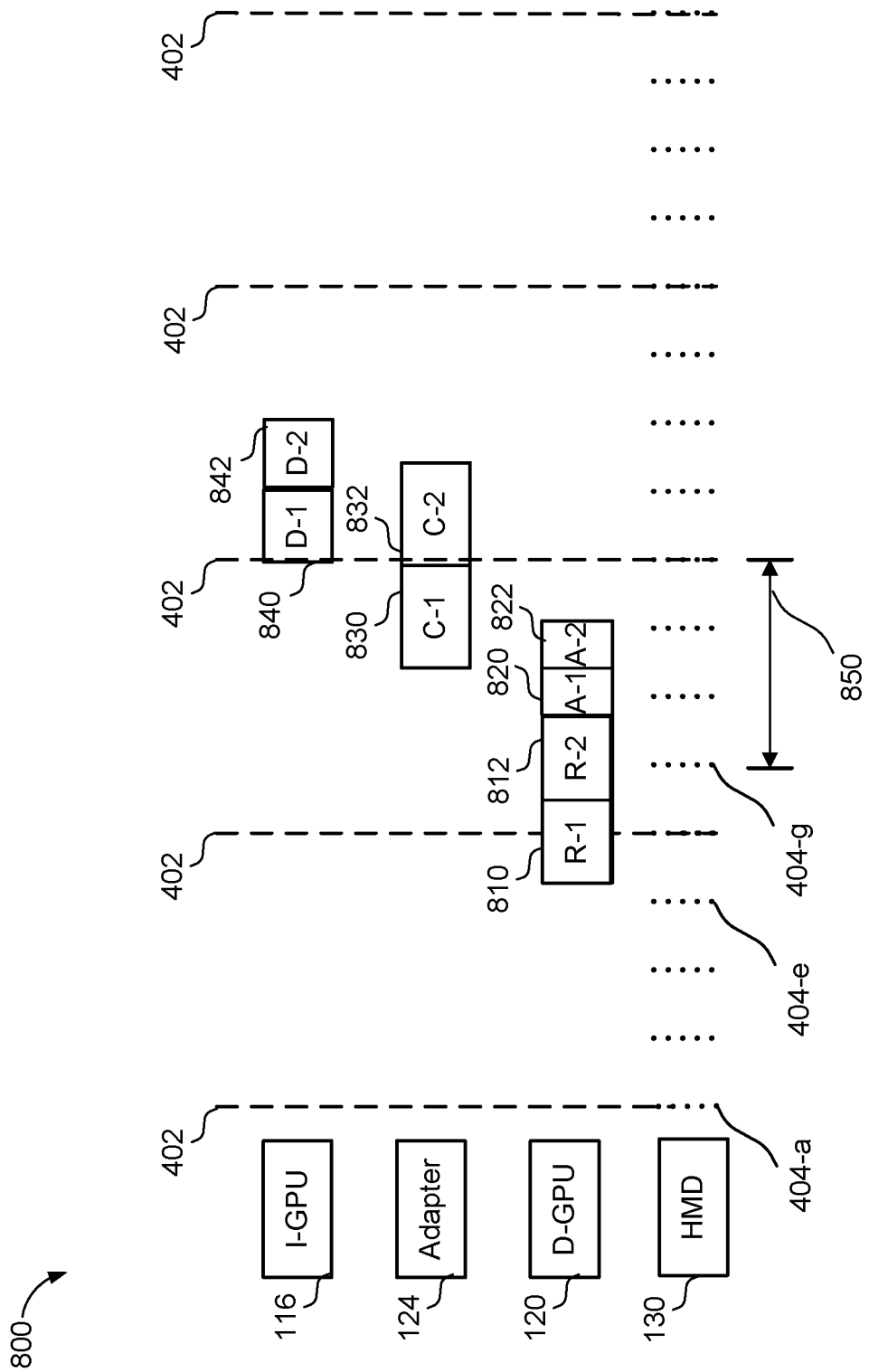
FIG. 8 is a timing diagram illustrating image processing in accordance with an implementation of the present disclosure.

Referring now to FIG. 8, timing diagram 800 illustrates another example of rendering and display of virtual reality images using the integrated GPU 116 and the discrete GPU 120, where latency reductions in presenting images may be obtained based on dividing the rendering into portions or chunks and performing some portion of the copying operations by the adapter 124 after the V-SYNC event 402. The rate of V-SYNC events 402 and pose updates 404 may be the same as in FIG. 4. The discrete GPU 120 may perform the rendering operations 810 and 812 as well as the adjustment operations 820 and 822. The adapter 124 may perform the copying operations 830 and 832, and the integrated GPU 116 may perform display operations 840 and 842. In an implementation, for example, the integrated GPU 116 may be unable to perform the adjustment operations 820, 822 or the discrete GPU 120 may perform the adjustment operations 820,822 significantly faster. The integrated GPU 116 may scan the final virtual reality images out to the HMD 130 in a set order (e.g., line-by-line starting from the top). Accordingly, when the portion of the image corresponding to the copying operation 832 is located in the last portion of the frame to be scanned, the adapter 124 may complete the copying operation 832 in the time between the V-SYNC event 402 and the time the last portion of the frame is scanned in display operation 842. In an implementation, completing a portion of the copying operation 832 after the V-SYNC event 402 may reduce the time between the second pose update 404-g and the V-SYNC event 402, leading to a reduced time period 850 in comparison to time period 450.

Figure 9:
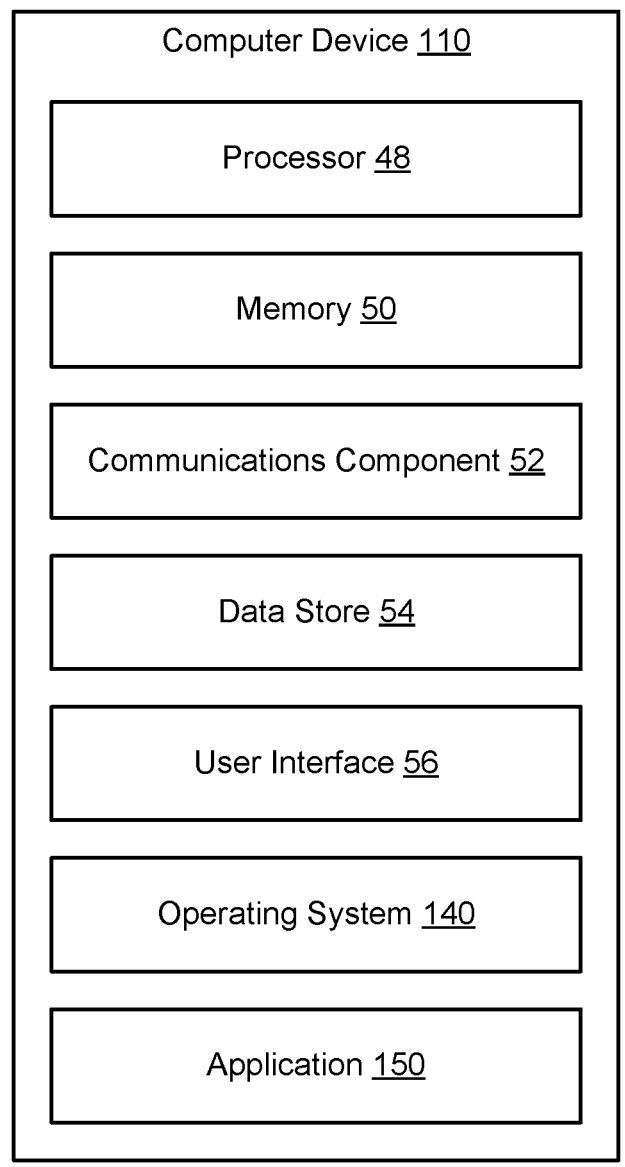
FIG. 9 is a schematic block diagram of an example computer device in accordance with an implementation of the present disclosure.

Referring now to FIG. 9, illustrated is an example computer device 110 in accordance with an implementation, including additional component details as compared to FIG. 1. In one example, computer device 110 may include processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 may include CPU 114, integrated GPU 116, and discrete GPU 120. In an example, computer device 110 may include memory 50 for storing instructions executable by the processor 48 for carrying out the functions described herein. In an implementation, for example, memory 50 may include memory 112 and/or memory 122.

Further, computer device 110 may include a communications component 52 that provides for establishing and maintaining communications with one or more parties utilizing hardware, software, and services as described herein. Communications component 52 may carry communications between components on computer device 110, as well as between computer device 110 and external devices, such as devices located across a communications network and/or devices serially or locally connected to computer device 110. For example, communications component 52 may include one or more buses, and may further include transmit chain components and receive chain components associated with a transmitter and receiver, respectively, operable for interfacing with external devices. In an implementation, for example, communications component 52 may include adapter 124 communicatively connecting integrated GPU 116 and discrete GPU 120.

Additionally, computer device 110 may include a data store 54, which can be any suitable combination of hardware and/or software, that provides for mass storage of information, databases, and programs employed in connection with implementations described herein. For example, data store 54 may be a data repository for operating system 140 (FIG. 1) and/or applications 150 (FIG. 1).

Computer device 110 may also include a user interface component 56 operable to receive inputs from a user of computer device 110 and further operable to generate outputs for presentation to the user. User interface component 56 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 56 may include one or more output devices, including but not limited to a display, a speaker, a haptic feedback mechanism, a printer, any other mechanism capable of presenting an output to a user, or any combination thereof.

In an implementation, user interface component 56 may transmit and/or receive messages corresponding to the operation of operating system 140 and/or application 150. In addition, processor 48 executes operating system 140 and/or application 150, and memory 50 or data store 54 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
    a memory to store data and instructions;
    a central processing unit in communication with the memory;
    a first graphics processing unit (GPU);
    a video port associated with the first GPU;
    a second GPU communicatively connected to the first GPU via an adapter;
    an application and a display control component in communication with the memory, the central processing unit, the first GPU, and the second GPU, operable to:
        receive, at the second GPU, first pose information of a head mounted display (HMD) connected to the video port;
        render, by the second GPU, a virtual reality source image from the application based on the first pose information;
        transfer the virtual reality source image via the adapter from the second GPU to the first GPU;
        receive, at the first GPU, second pose information of the HMD obtained after at least a first portion of the virtual reality source image has been transferred to the first GPU;
        adjust, by the first GPU, the virtual reality source image based on the second pose information to compensate for movement of the HMD between a time of the first pose information and a time that the first portion of the virtual reality source image has been transferred to the first GPU, wherein the first GPU completes adjusting at least the first portion of the virtual reality source image before a video synchronization; and
        display the adjusted virtual reality image on the HMD by scanning out the adjusted first portion of the virtual reality image via the video port starting at the video synchronization, wherein the adjusting comprises adjusting a second portion of the virtual reality source image after the video synchronization and before the second portion is scanned out to the HMD.

2. The computer device of claim 1, further comprising the HMD.

3. The computer device of claim 1, wherein the first GPU is operable to receive the second pose information at a set time before the video synchronization, the set time configured to allow the first GPU to complete adjusting at least the first portion of the virtual reality source image before the video synchronization.

4. The computer device of claim 1, wherein the second GPU is operable to transfer a portion of the virtual reality source image prior to completing the rendering.

5. The computer device of claim 4, wherein the portion of the virtual reality source image includes a portion of a left eye image and a portion of a right eye image.

6. The computer device of claim 4, wherein the second GPU is operable to transfer portions of the virtual reality source image in an order in which the first GPU scans portions of the adjusted images to the HMD.

7. A method for displaying virtual reality images comprising:
   receiving, at a second graphics processing unit (GPU), first pose information of a head mounted display (HMD) connected to a video port associated with a first GPU;
   rendering, by the second GPU, a virtual reality source image from an application based on the first pose information;
   transferring the virtual reality source image from the second GPU to the first GPU via an adapter;
   receiving, at the first GPU, second pose information of the HMD obtained after at least a first portion of the virtual reality source image has been transferred to the first GPU;
   adjusting, by the first GPU, the virtual reality source image based on the second pose information to compensate for movement of the HMD between a time of the first pose information and a time that the first portion of the virtual reality source image has been transferred to the first GPU, wherein the adjusting of at least a first portion of the virtual reality source image is completed before a video synchronization; and
   displaying the adjusted virtual reality image on the HMD by scanning out the adjusted first portion of the virtual reality image via the video port starting at the video synchronization, wherein the first GPU is operable to complete adjusting a second portion of the virtual reality source image after the video synchronization and before the second portion is scanned out to the HMD.

8. The method of claim 7, wherein receiving the second pose information comprises receiving the second pose information at a set time before a video synchronization, the set time configured to allow the first GPU to complete adjusting at least the first portion of the virtual reality source image before the video synchronization.

9. The method of claim 7, wherein the transferring comprises transferring a portion of the virtual reality source image prior to completing the rendering.

10. The method of claim 9, wherein the portion of the virtual reality source image includes a portion of a left eye image and a portion of a right eye image.

11. The method of claim 9, wherein the transferring comprises transferring portions of the virtual reality source image in an order in which the adjusted images are scanned to the HMD.

12. A non-transitory computer-readable medium, comprising code executable by one or more processors for rendering graphics using a first graphics processing unit (GPU) and a second GPU in a computing device, the code comprising code for:
   receiving, at the second GPU, first pose information of a head mounted display (HMD) connected to a video port associated with the first GPU;
   rendering, by the second GPU, a virtual reality source image from an application based on the first pose information;
   transferring the virtual reality source image from the second GPU to the first GPU, wherein at least a first portion of the virtual reality source image is transferred prior to a video synchronization;
   receiving, at the first GPU or the second GPU, second pose information of the HMD at a set time before a video synchronization, the set time configured to allow the first GPU or the second GPU to complete adjusting at least the first portion of the virtual reality source image before the video synchronization;
   adjusting, by the first GPU or the second GPU, the virtual reality source image based on the second pose information to compensate for movement of the HMD between a time of the first pose information and the set time, wherein the adjusting of at least the first portion of the virtual reality source image is completed before the video synchronization; and
   displaying the adjusted virtual reality image on the HMD via the video port starting at the video synchronization, wherein at least one of the transferring or the adjusting of a second portion of the virtual reality source image continues after the video synchronization.

13. The non-transitory computer-readable medium of claim 12, wherein the code for adjusting comprises code for adjusting a second portion of the virtual reality source image after the video synchronization and before the second portion is scanned by the HMD.

14. The non-transitory computer-readable medium of claim 12, wherein the code for transferring comprises code for transferring a portion of the virtual reality source image prior to completing the rendering.

15. The non-transitory computer-readable medium of claim 14, wherein the portion of the virtual reality source image includes a portion of a left eye image and a portion of a right eye image.

16. The non-transitory computer-readable medium of claim 14, wherein the code for transferring comprises code for transferring portions of the virtual reality source image in an order in which the adjusted images are scanned to the HMD.

17. The non-transitory computer-readable medium of claim 12, wherein the set time is configured to allow the second GPU to complete adjusting at least the first portion of the virtual reality source image and complete transferring at least the first portion of the virtual reality source image from the second GPU to the first GPU before the video synchronization.

* * * * *